United States Patent [19]

Jackson

[11] 4,451,313
[45] May 29, 1984

[54] PNEUMATIC TIRES

[75] Inventor: William L. Jackson, Sutton Coldfield, England

[73] Assignee: Dunlop Limited, London, England

[21] Appl. No.: 366,169

[22] Filed: Apr. 7, 1982

Related U.S. Application Data

[63] Continuation of Ser. No. 914,722, Jun. 12, 1978, abandoned, which is a continuation-in-part of Ser. No. 868,582, Jan. 11, 1978, abandoned.

[30] Foreign Application Priority Data

Jan. 11, 1977 [GB] United Kingdom ............... 1019/77

[51] Int. Cl.³ ................ B29H 17/10; B29H 17/12; B60C 9/02; B60C 9/18
[52] U.S. Cl. ................................ 156/132; 156/133; 156/135; 156/401; 152/354 R; 152/361 R
[58] Field of Search ................... 156/111, 110.1, 123, 156/126–127, 133, 131–132, 135, 416, 400, 401; 152/354 R, 355, 356 R, 356 A, 361

[56] References Cited

U.S. PATENT DOCUMENTS

| | | | |
|---|---|---|---|
| 1,732,793 | 10/1929 | Darrow | 152/354 |
| 2,493,614 | 1/1950 | Bourdon | 152/356 |
| 2,894,555 | 7/1959 | Bourdon | 152/361 R |
| 2,976,905 | 3/1961 | Beckadolph | 152/354 |
| 3,053,308 | 9/1962 | Vanzo et al. | 156/133 |
| 3,451,461 | 6/1969 | Wittneben | 152/361 X |
| 3,481,386 | 12/1969 | Menell et al. | 152/354 |
| 3,540,511 | 11/1970 | Mirtain | 152/354 R |
| 3,568,749 | 3/1971 | Menell et al. | 152/354 X |
| 3,580,318 | 5/1971 | Menell et al. | 152/361 X |
| 3,730,246 | 5/1973 | Sidles et al. | |
| 3,760,858 | 9/1973 | Grossett | 152/356 X |
| 3,853,653 | 12/1974 | Olbert et al. | 156/133 |
| 3,861,440 | 1/1975 | Ochiai et al. | 152/361 R |
| 3,864,188 | 2/1975 | Grawey et al. | 156/397 |
| 3,883,387 | 5/1975 | Csatlos | 156/133 |
| 4,072,550 | 2/1978 | Stalter | 156/133 |
| 4,075,054 | 2/1978 | Sons, Jr. | 152/123 R X |
| 4,150,703 | 4/1979 | Sons, Jr. | 152/361 R |

FOREIGN PATENT DOCUMENTS

| | | | |
|---|---|---|---|
| 438294 | 2/1970 | Australia . | |
| 1605615 | 1/1971 | Fed. Rep. of Germany . | |
| 2416445 | 10/1974 | Fed. Rep. of Germany | 152/354 |
| 2801064 | 7/1978 | Fed. Rep. of Germany RB | 152/354 |
| 1148638 | 12/1957 | France | 152/361 |
| 1187693 | 9/1959 | France . | |
| 1413102 | 7/1965 | France . | |
| 1495964 | 7/1967 | France . | |
| 1538478 | 7/1968 | France . | |
| 2093277 | 1/1972 | France . | |
| 1118067 | 6/1968 | United Kingdom . | |
| 1168299 | 10/1969 | United Kingdom . | |
| 1169427 | 11/1969 | United Kingdom . | |
| 1371333 | 10/1974 | United Kingdom . | |

Primary Examiner—Lois E. Boland
Attorney, Agent, or Firm—Stevens, Davis, Miller & Mosher

[57] ABSTRACT

A pneumatic tire which comprises:

a tread portion; a breaker structure to brace the tread portion; two sidewalls each having an associated bead containing a bead core, and each sidewall containing a reinforcing ply of cords anchored around the bead core of the respective one of said associated beads and extending into the tread portion radially outwardly of the breaker structure to overlap at least part of the width of the breaker structure but terminating short of the other of said associated beads.

12 Claims, 8 Drawing Figures

PNEUMATIC TIRES

This is a continuation of application Ser. No. 914,722 filed June 12, 1978, now abandoned, which in turn is a continuation in part of Ser. No. 868,582 filed Jan. 11, 1978, which was abandoned.

This invention relates to pneumatic tires, in particular to pneumatic tires in which the tread is braced by means of a breaker structure.

A common cause of failure of such pneumatic tires results from a looseness developing at the edge of the breaker structure and gradually progressing until the breaker structure is detached from the tire casing. This looseness is not immediately visible from the tire exterior but results in friction between the separated tire parts which generates heat and leads to rapid failure of the tire.

It has now been found, according to the present invention, that the disadvantage referred to above can be obviated by the use of at least two reinforcing cord plies, each anchored to the bead cores of the two tire beads, and extending radially outwardly of the breaker structure but not extending as far as the other bead.

Accordingly the present invention provides a pneumatic tire which comprises a tread portion; a breaker structure to brace the tread portion; two sidewalls each having an associated bead containing a bead core, and each sidewall containing a reinforcing ply of cords anchored around the bead core of the respective one of said associated beads and extending into the tread portion radially outwardly of the breaker structure to overlap at least part of the width of the breaker structure but terminating short of the other of said associated beads.

It is not intended that this specification should be construed with reference to any particular theory, but it is believed that in conventional radial ply tires, where the sidewall reinforcing plies extend radially inwards of the breaker structure, tension in the casing of the tire tends to pull the rubber of the tire inwardly in the radial direction and away from the radially inner surface of the breaker structure. This stress aggravates any failure at the edge of the breaker structure. By placing the reinforcing cord plies radially outwards of the breaker structure the tensile stress in the sidewalls is replaced by a compressive stress. In consequence, any failure cracks which arise at the edge of the breaker grow very much more slowly than they do in rubber sidewalls under tensile stress.

Preferably the breaker structure consists of two or more superimposed plies of parallel cords, the cords in at least one of the plies being disposed at an angle (for example in the range from 10° to 30°) to the mid-circumferential plane of the tire. Alternate plies are preferably arranged so that the angle their cords make with the mid-circumferential plane is in the opposite sense to the adjacent ply or plies. Preferably the plies comprise metal cords, e.g. steel, but they can be of any other suitable material, for example glass or textile material e.g. an aromatic polyamide, polyester, nylon or rayon.

The breaker structure may include in addition a radially inner ply of parallel cords disposed at an angle to the mid-circumferential plane of the tire of from 75° to 90°. More preferably the angle of the cords in the additional angle ply is between 80° and 90°.

Preferably the sidewall reinforcing plies comprise cords which are disposed in substantially radial planes, although if desired the sidewall reinforcing plies may be disposed so that their cords are at equal and opposite bias angles in the range between 35° and 90° to the mid-circumferential plane of the tire.

The anchored reinforcing cord plies referred to above are conveniently two in number, one anchored to each of two bead cores, through a larger number can be used. The description hereinafter is with particular reference to tires having only two such anchored reinforcing plies.

Each anchored ply extends radially outwards of the breaker structure so as to overlap the axial width thereof to some extent. Preferably, the degree of overlap is such that the entire axial width of the breaker structure is overlapped by each reinforcing ply, and it is preferred that each ply terminates in the region of, but preferably not closer than 5 mm. from, an axial edge of the breaker structure, said axial edge being located on the opposite side of the mid-circumferential plane of the tire from that on which is located the bead anchoring the respective ply.

In an alternative construction each ply overlaps only part of the breaker structure, for example by an amount not less than one third of its axial width. In such cases the two reinforcing plies do not overlap each other.

In a further form of the invention the tire has an annular ply of parallel cords disposed radially outwardly of the radially outer extremeties of the sidewall reinforcing plies.

This annular ply can be used in any of the various types of tires of the invention referred to above. The annular ply preferably overlaps the entire axial width of the breaker structure. However, even where it does not, it should be of such length that when said two reinforcing plies do not overlap each other, the annular ply extends at least so far as to overlap the end portions of each ply, that is to "bridge" the gap (if any) between them.

Specific examples of tires according to the present invention are now described, by way of example, with reference to the accompanying drawings in which.

Figure 1:
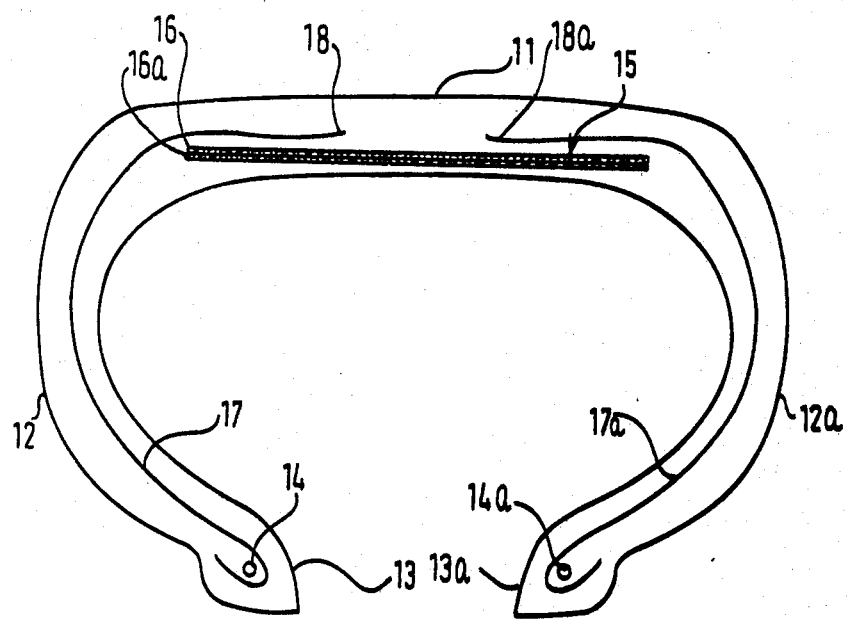
FIG. 1 is a diagrammatic representation of a radial section of a first pneumatic tire.

The tire illustrated in FIG. 1 has a tread portion 11 and a pair of sidewalls 12, 12a terminating respectively in tire beads 13,13a containing inextensible reinforcing cores 14,14a. The tread portion 11 is reinforced by a breaker structure 15 consisting of two superimposed plies of parallel steel cords 16,16a, the plies being disposed so that the cords in one ply lie at an angle 20° to the mid-circumferential plane of the tire, and the cords in the other ply also lie at an angle of 20° to said plane but in the other sense. The sidewalls 12,12a are reinforced respectively by single plies 17,17a, of radially extending cords anchored respectively around the bead cores 14,14a and extending radially outwardly into the tread region where they pass radially outwardly of the breaker structure 15, each overlap about one-third of the axial width of the breaker structure and terminate respectively at 18,18a.

Figure 2:
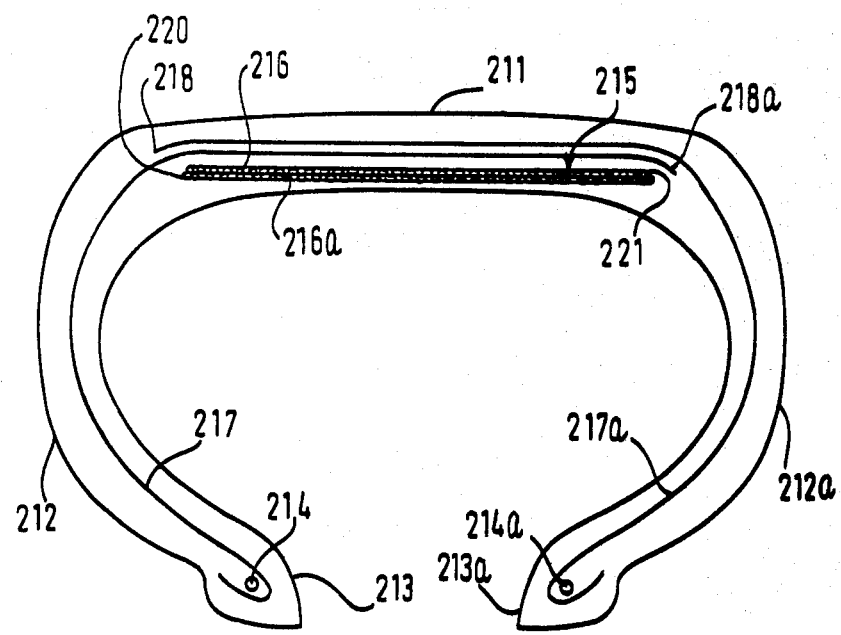
FIG. 2 is a diagrammatic representation of a radial section through a second pneumatic tire.

The tire illustrated in FIG. 2 is similar to that of FIG. 1 and like parts are indicated by like reference numerals but with the prefix 2. The sidewalls 212, 212a terminate respectively in beads 213, 213a and are reinforced respectively by single plies 217, 217a of radially extending cords anchored respectively around the bead cores 214,214a and extending radially outwardly into the tread region where they each pass radially outwardly of the breaker structure 215. However, in this tire the plies 217,217a overlap each other and terminate at 218,218a adjacent the opposite edges 220, 221 of the breaker structure 215. This arrangement results in a stiffening of the tire shoulder region.

Figure 3:
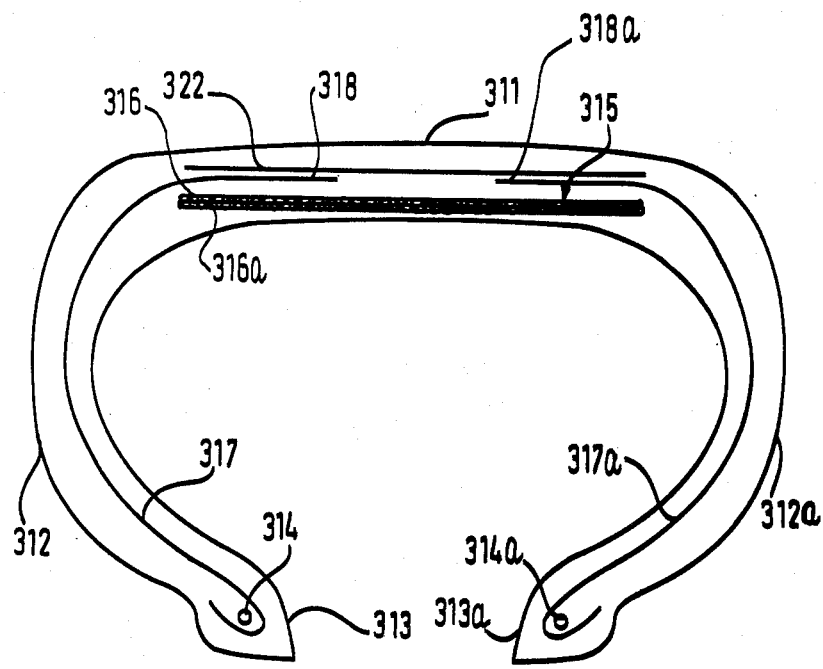
FIG. 3 is a diagrammatic representation of a radial section through a third pneumatic tire.

The tire illustrated in FIG. 3 is also similar to that illustrated in FIG. 1, and like parts are indicated by like reference numerals but with the prefix 3. However, this tire has an annular ply 322 of parallel steel cords disposed radially outwardly of the radially outer edges of the sidewall reinforcing plies 317,317a. In the ply 322 the steel cords are disposed at an angle of 90° to the mid-circumferential plane of the tire.

A process for the manufacture of a pneumatic tire according to the present invention is now described with reference to FIGS. 4 to 8.

Figure 4:
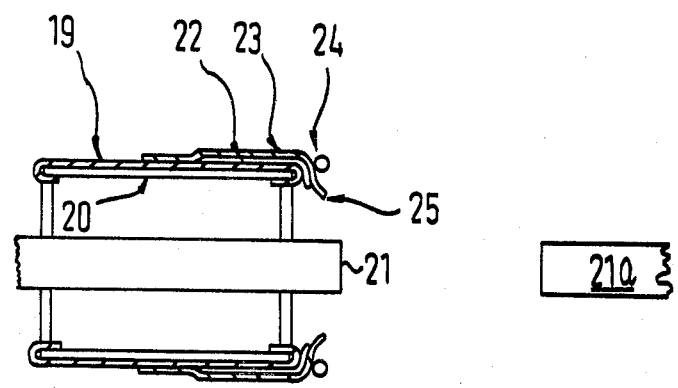
FIGS. 4 to 8 are diagrammatic representations showing various stages in a process for the manufacture of a pneumatic tire of the invention.

FIG. 4 shows, in cross-section, the first stage of a tire-building process, in which the sidewall components are assembled on an elastomeric cylindrical former 19 of approximately bead core diameter and supported by a rigid cylinder 20 mounted on axle 21. This operation is carried out in duplicate, there being a second, similar former on the co-linear axle 21a. This second former is not shown in the drawings, but the location of that former is indicated by the axially inner end of axle 21a. The said sidewall components can include, for example, in the order of presentation to the former 19:

a strip of sidewall protective compound 22, a narrower strip of pre-cured rubber chafer compound (not shown) attached to the right-hand side (as seen in FIG. 4) of protective compound 22, a strip of calendered tire cord fabric 23, cut so that the cords run substantially transverse to the length of the strip, and, a prepared head core 24, consisting of coils of rubberized steel wire wound into a hoop and carrying an extruded apex strip (not shown) of triangular section attached to its outer surface and held in position by a thin layer of rubberized fabric (not shown) wrapped around both bead core and apex strip.

The bead core can be presented to the assembly by sliding a bead holder along the axle 21. Once the bead is is position the holder can be removed and the edges 25 of the cord fabric are folded upwards and outwards around the bead by hand. After this, a strip of inner lining material (not shown) is attached to the assembly.

The process described above is similar to conventional tire-building processes except that the narrow strips of protective sidewall compound and the lining are used so as to leave a predetermined amount of the cord fabric uncovered (see FIG. 4) to provide the overlap joint with the breaker structure at a later stage.

Figure 5:
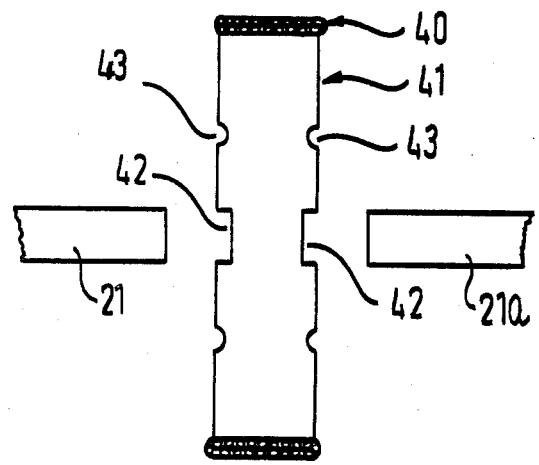

Referring now to FIG. 5, the breaker structure 40, for the tire is assembled on a cylindrical, collapsible former 41. This former has two cylindrical recesses 42 and two annular grooves 43, the purposes of which will be described below.

Typically, the breaker structure 40 is produced by laying on the cylindrical surface of the former 41 first, a layer of lining compound followed by two layers of breaker reinforcement cord fabric cut at opposite bias angles to each other of about 25°. If desired, strips of insulation compound can be used between the edges of the breaker structure or on top of the edges. The lining compound layer is normally wider than the former 41 so that a narrow border can be folded down each side to form an overlap joint with the strips of lining material on the casing when these parts are attached to the breaker structure.

Figure 6:
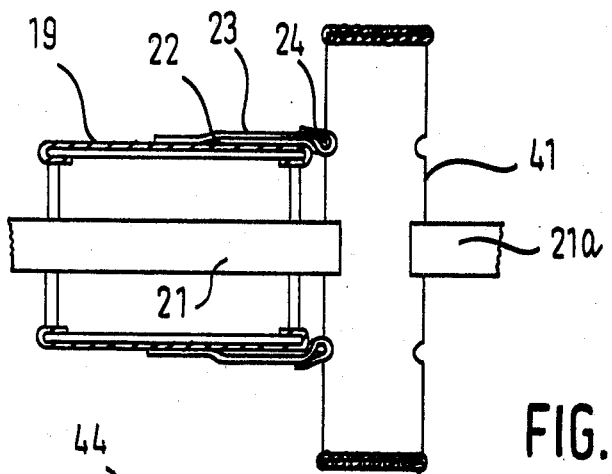

As illustrated in FIG. 6, the axles 21 and 21a are moved inwardly to locate the formers 19 with respect to the sides of the breaker former 41.

Figure 7:
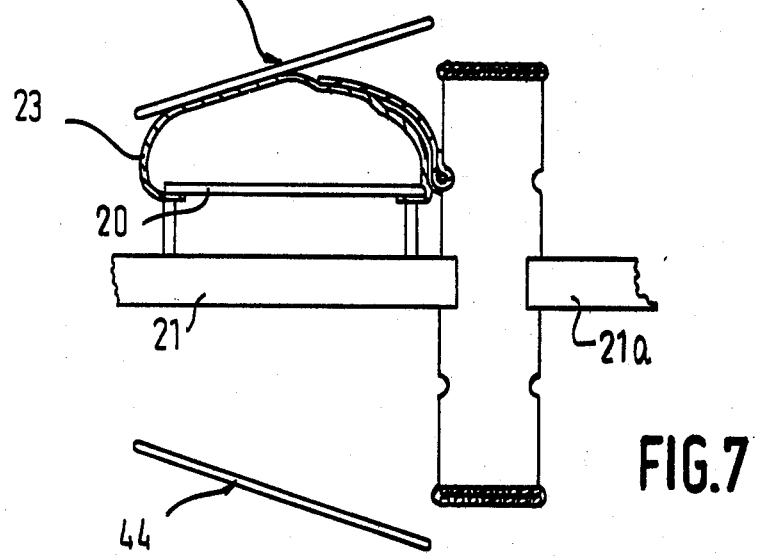
Figure 8:
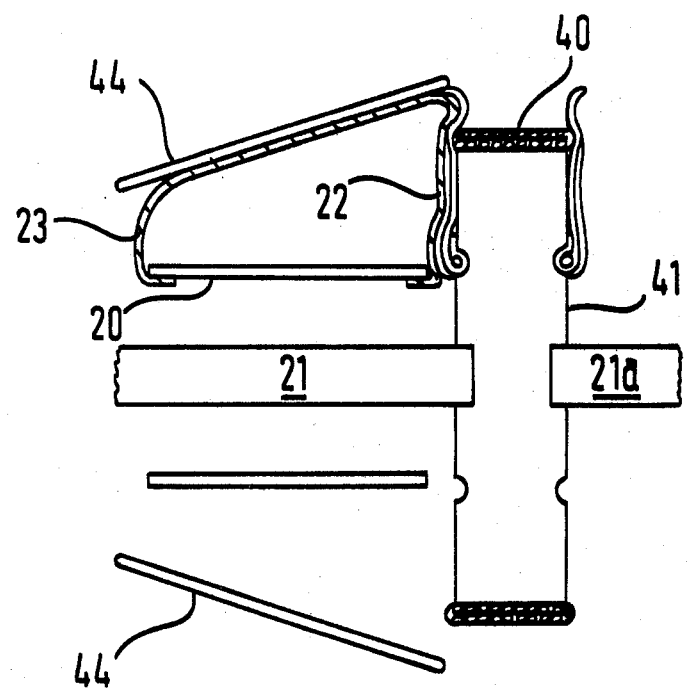

As illustrated in FIGS. 7 and 8, the two cylindrical formers 19 are then partially inflated and as the radius of these formers increases the plies 23 are stretched. Those parts of the former not supporting tire components tend to expand first and it is an advantage to restrain this tendency by providing cones 44. As shown in FIG. 8 the cones 44 act to restrain the axial outer edge of the inflatable formers during inflation of the formers so that the axial outer edges of the sidewall component, including the reinforcing plies 23, are applied last.

FIG. 8 shows the last stage in the tire-building process where the inflation of the formers 19 has continued to the point where the outer edges of the plies have begun to fold over the breaker structure. The cylindrical formers 19 can then be collapsed leaving the sidewall plies 23 adhering to the breaker structure for consolidation by conventional methods, and, finally, the addition of the tread. The tire is then cured in a heated mould.

The improvement in breaker edge looseness performance achieved by this invention stems from the redistribution of stress obtained by locating the sidewall reinforcing plies radially outwardly of the breaker structure.

Having now described my invention what I claim is:

1. A method of making a pneumatic tire comprising the steps of:
    assembling on each of a pair of inflatable cylindrical formers which are in substantial axial alignment a respective tire sidewall component including a respective reinforcing ply having inner and outer ends;
    arranging each tire sidewall component so that an axially outer free end portion of said reinforcing ply is uncovered on the associated former and an axially inner opposite end portion of said reinforcing ply terminates at a respective tire bead;
    folding said opposite end portion of said reinforcing ply around said tire bead;
    assembling a tire breaker structure on a collapsible cylindrical former positionable between said pair of inflatable formers; and
    inflating said inflatable formers to bring said uncovered axially outer free end portions of said reinforcing plies of the associated tire sidewall component adjacent to and radially overlapping a respective axial edge of said breaker structure but terminating short of the other tire bead.

2. The method of claim 1, including restraining the axially outer edge of the inflatable formers during inflation thereof so that the axial outer edge of the sidewall component is applied last.

3. The method of claim 1, wherein each sidewall reinforcing ply comprises at least one ply of radial cords.

4. The method of claim 1, wherein each sidewall reinforcing ply comprises at least one ply of cords angled with respect to the mid-circumferential plane of the tire.

5. The method of claim 1, wherein the uncovered axially outer ends of the reinforcing plies are axially spaced apart.

6. The method of claim 1, wherein the uncovered axially outer ends of the reinforcing plies axially overlap one another in a position radially outside said breaker structure.

7. A method of making a pneumatic tire having a tread reinforced by a breaker, said breaker being connected at each axial edge to a respective sidewall, each sidewall terminating at its radially inner edge in a respective bead and a respective reinforcing ply originating from each bead and extending to and radially overlapping the breaker but terminating short of the other bead comprising the steps of:

assembling on a pair of inflatable cylindrical formers which are of approximately bead diameter and spaced apart in substantial axial alignment, a respective tire sidewall component including a respective reinforcing ply placing a respective bead core assembly on the axially inner portion of each said inflatable former;

arranging each tire sidewall component so that an axially outer free end portion of said reinforcing ply is uncovered on the associated former and an axially inner opposite end portion of said reinforcement structure terminates at the associated bead core assembly;

folding said opposite end portion of said reinforcing ply around said tire bead core;

assembling a tire breaker structure on a collapsible cylindrical former of larger diameter than and positionable between said pair of inflatable formers;

moving said pair of inflatable formers axially inwardly toward said collapsible cylindrical former;

inflating said pair of inflatable formers so as to stretch the associated tire sidewall component axially and radially outwardly from the associated bead core assembly to which it is secured so as to bring said uncovered axially outer end portion of said reinforcing ply of the associated tire sidewall component adjacent to and radially overlapping a respective axial edge of said breaker structure; and placing tread rubber over the radial outer surface of the then assembled tire carcass.

8. The method of claim 7, including restraining the axially outer edge of the inflatable formers during inflation thereof so that the axial outer edge of the sidewall component is applied last.

9. The method of claim 7, wherein each sidewall reinforcing ply comprises at least one ply of radial cords.

10. The method of claim 7, wherein each sidewall reinforcing ply comprises at least one ply of cords angled with respect to the mid-circumferential plane of the tire.

11. The method of claim 7, wherein the uncovered axially outer ends of the reinforcing plies are axially spaced apart.

12. The method of claim 7, wherein the uncovered axially outer ends of the reinforcing plies axially overlap one another in a position radially outside said breaker structure.

* * * * *